(12) United States Patent
Prammer

(10) Patent No.: US 10,995,567 B2
(45) Date of Patent: May 4, 2021

(54) LOGGING-WHILE-TRIPPING SYSTEM AND METHODS

(71) Applicant: Manfred G. Prammer, Downingtown, PA (US)

(72) Inventor: Manfred G. Prammer, Downingtown, PA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/406,200

(22) Filed: May 8, 2019

(65) Prior Publication Data

US 2019/0264515 A1 Aug. 29, 2019

Related U.S. Application Data

(62) Division of application No. 15/155,824, filed on May 16, 2016, now Pat. No. 10,329,856.

(Continued)

(51) Int. Cl.
*E21B 19/16* (2006.01)
*E21B 17/00* (2006.01)
(Continued)

(52) U.S. Cl.
CPC ............ *E21B 19/16* (2013.01); *E21B 17/003* (2013.01); *E21B 17/028* (2013.01);
(Continued)

(58) Field of Classification Search
CPC ...... E21B 19/16; E21B 17/003; E21B 17/028; E21B 47/122; E21B 47/124; H04B 3/58
See application file for complete search history.

(56) References Cited

U.S. PATENT DOCUMENTS

| 2,000,716 A | 5/1935 | Polk |
| 2,370,818 A | 3/1945 | Silverman |

(Continued)

FOREIGN PATENT DOCUMENTS

| EP | 0481865 A1 | 4/1992 |
| WO | 2004113677 A1 | 12/2004 |

(Continued)

OTHER PUBLICATIONS

"DuPont Pyralux AP All-Polyimide Flexible Laminate," data sheet, Mar. 2001, DuPont Electronic Materials, Research Triangle Park, NC 27709-4425, 8 pages.

(Continued)

*Primary Examiner* — Amine Benlagsir
(74) *Attorney, Agent, or Firm* — Cantor Colburn LLP

(57) ABSTRACT

A downhole communication repeater adapted for use on a wired drill pipe that extends from a surface to a bottom hole assembly that includes downhole communication equipment, and the surface has surface communication equipment located thereon. The repeater includes memory adapted: to store segments of logging-while-tripping data received from said downhole communication equipment and a microprocessor adapted to receive said logging-while-tripping data; to store said logging-while-tripping data in said memory while said repeater is deployed along a drill string in a well; and to re-transmit segments of said logging-while-tripping data while said repeater is cut off from downhole communications during a tripping operation.

13 Claims, 10 Drawing Sheets

Related U.S. Application Data

(60) Provisional application No. 62/163,697, filed on May 19, 2015.

(51) Int. Cl.
*E21B 17/02* (2006.01)
*H04B 3/58* (2006.01)
*E21B 47/113* (2012.01)
*E21B 47/26* (2012.01)

(52) U.S. Cl.
CPC .......... *E21B 47/113* (2020.05); *E21B 47/26* (2020.05); *H04B 3/58* (2013.01)

(56) References Cited

U.S. PATENT DOCUMENTS

| | | | |
|---|---|---|---|
| 2,379,800 A | 7/1945 | Hare | |
| 3,090,031 A | 5/1963 | Lord | |
| 3,170,137 A | 2/1965 | Brandt | |
| 3,518,608 A | 6/1970 | Papadopoulos | |
| 3,713,089 A | 1/1973 | Clacomb | |
| 3,805,606 A | 4/1974 | Stelzer et al. | |
| 3,958,217 A | 5/1976 | Spinnler | |
| 4,087,781 A | 5/1978 | Grossi et al. | |
| 4,215,426 A | 7/1980 | Klatt | |
| 4,220,381 A | 9/1980 | Van Der Graaf | |
| 4,266,606 A | 5/1981 | Stone | |
| 4,283,779 A | 8/1981 | Lamel | |
| 4,375,310 A | 3/1983 | Robinson et al. | |
| 4,387,372 A | 6/1983 | Smith et al. | |
| 4,445,734 A | 5/1984 | Cunningham | |
| 4,605,268 A | 8/1986 | Meador | |
| 4,647,941 A | 3/1987 | Myer | |
| 4,788,544 A | 11/1988 | Howard | |
| 4,792,802 A | 12/1988 | Meadows | |
| 4,914,433 A | 4/1990 | Galle | |
| 5,122,662 A | 6/1992 | Chen et al. | |
| 5,589,825 A | 12/1996 | Pomerleau | |
| 6,123,561 A | 9/2000 | Turner et al. | |
| 6,392,317 B1 | 5/2002 | Hall et al. | |
| 6,670,880 B1 | 12/2003 | Hall et al. | |
| 6,727,707 B2 | 4/2004 | Sinclair et al. | |
| 6,821,147 B1 | 11/2004 | Hall et al. | |
| 6,830,467 B2 | 12/2004 | Hall et al. | |
| 6,913,093 B2 | 7/2005 | Hall et al. | |
| 6,945,802 B2 | 9/2005 | Hall et al. | |
| 6,958,704 B2 | 10/2005 | Vinegar et al. | |
| 6,968,611 B2 | 11/2005 | Hall et al. | |
| 6,981,546 B2 | 1/2006 | Hall et al. | |
| 6,982,384 B2 | 1/2006 | Hall et al. | |
| 6,991,035 B2 | 1/2006 | Hall et al. | |
| 6,992,554 B2 | 1/2006 | Hall et al. | |
| 7,017,667 B2 | 3/2006 | Hall et al. | |
| 7,019,665 B2 | 3/2006 | Hall et al. | |
| 7,025,130 B2 | 4/2006 | Bailey et al. | |
| 7,040,003 B2 | 5/2006 | Hall et al. | |
| 7,041,908 B2 | 5/2006 | Hall et al. | |
| 7,053,788 B2 | 5/2006 | Hall et al. | |
| 7,064,676 B2 | 6/2006 | Hall et al. | |
| 7,069,999 B2 | 7/2006 | Hall et al. | |
| 7,080,998 B2 | 7/2006 | Hall et al. | |
| 7,091,810 B2 | 8/2006 | Hall et al. | |
| 7,093,654 B2 | 8/2006 | Hall et al. | |
| 7,096,961 B2 | 8/2006 | Clark et al. | |
| 7,098,767 B2 | 8/2006 | Hall et al. | |
| 7,098,802 B2 | 8/2006 | Hall et al. | |
| 7,114,970 B2 | 10/2006 | Head | |
| 7,116,199 B2 | 10/2006 | Hall et al. | |
| 7,142,129 B2 | 11/2006 | Hall et al. | |
| 7,190,280 B2 | 3/2007 | Hall et al. | |
| 7,193,526 B2 | 3/2007 | Hall et al. | |
| 7,193,527 B2 | 3/2007 | Hall et al. | |
| 7,198,118 B2 | 4/2007 | Hall et al. | |
| 7,200,070 B2 | 4/2007 | Hall et al. | |
| 7,201,240 B2 | 4/2007 | Hall et al. | |
| 7,207,396 B2 | 4/2007 | Hall et al. | |
| 7,224,288 B2 | 5/2007 | Hall et al. | |
| 7,228,902 B2 | 6/2007 | Oppelt | |
| 7,243,717 B2 | 7/2007 | Hall et al. | |
| 7,248,177 B2 | 7/2007 | Hall et al. | |
| 7,252,160 B2 | 8/2007 | Dopf et al. | |
| 7,253,745 B2 | 8/2007 | Hall et al. | |
| 7,268,697 B2 | 9/2007 | Hall et al. | |
| 7,275,597 B2 | 10/2007 | Hall et al. | |
| 7,276,910 B2 | 10/2007 | Prsha et al. | |
| 7,277,026 B2 | 10/2007 | Hall et al. | |
| 7,291,303 B2 | 11/2007 | Hall et al. | |
| 7,298,286 B2 | 11/2007 | Hall | |
| 7,299,867 B2 | 11/2007 | Hall et al. | |
| 7,362,235 B1 | 4/2008 | Normann et al. | |
| 7,400,262 B2 | 7/2008 | Chemali et al. | |
| 7,453,768 B2 | 11/2008 | Hall et al. | |
| 7,525,264 B2 | 4/2009 | Dodge | |
| 7,530,737 B2 | 5/2009 | Thompson et al. | |
| 7,535,377 B2 | 5/2009 | Hall et al. | |
| 7,777,644 B2 | 8/2010 | Madhavan et al. | |
| 7,806,191 B2 | 10/2010 | Braden et al. | |
| 7,852,232 B2 | 12/2010 | Hall et al. | |
| 8,033,329 B2 | 10/2011 | Montgomery et al. | |
| 8,049,506 B2 | 11/2011 | Lazarev | |
| 8,072,347 B2 | 12/2011 | Santoso et al. | |
| 8,109,329 B2 | 2/2012 | Bray et al. | |
| 8,115,495 B2 | 2/2012 | Harmon | |
| 8,118,093 B2 | 2/2012 | Hassell et al. | |
| 8,120,508 B2 | 2/2012 | Madhavan et al. | |
| 8,130,118 B2 | 3/2012 | Hall et al. | |
| 8,242,928 B2 | 8/2012 | Prammer | |
| 8,704,677 B2 | 4/2014 | Prammer | |
| 2003/0102980 A1 | 6/2003 | Koro | |
| 2003/0171109 A1 | 9/2003 | Ballweber et al. | |
| 2004/104797 A1 | 6/2004 | Hall et al. | |
| 2004/0124994 A1 | 7/2004 | Oppelt | |
| 2004/0150533 A1 | 8/2004 | Hall et al. | |
| 2004/0217880 A1* | 11/2004 | Clark | E21B 17/028 340/854.9 |
| 2005/0001735 A1 | 1/2005 | Hall et al. | |
| 2005/0024231 A1 | 2/2005 | Fincher et al. | |
| 2005/0207279 A1 | 9/2005 | Chemali et al. | |
| 2005/0212530 A1 | 9/2005 | Hall et al. | |
| 2005/0284662 A1 | 12/2005 | Hall et al. | |
| 2006/0050820 A1 | 3/2006 | Kawada et al. | |
| 2006/0244628 A1 | 11/2006 | Bausov | |
| 2006/0254764 A1 | 11/2006 | Zuilekom | |
| 2006/0260801 A1 | 11/2006 | Hall et al. | |
| 2007/0024217 A1 | 2/2007 | Dodge | |
| 2007/0247328 A1 | 10/2007 | Petrovic et al. | |
| 2007/0279063 A1 | 12/2007 | Beard | |
| 2008/0012569 A1 | 1/2008 | Hall et al. | |
| 2008/0060846 A1* | 3/2008 | Belcher | E21B 17/042 175/25 |
| 2008/0180333 A1 | 7/2008 | Martiskainen et al. | |
| 2008/0253230 A1 | 10/2008 | Thompson et al. | |
| 2008/0285619 A1 | 11/2008 | Thompson et al. | |
| 2009/0032303 A1 | 2/2009 | Johnson | |
| 2009/0151938 A1* | 6/2009 | Conkle | E21B 43/26 166/254.1 |
| 2009/0153424 A1 | 6/2009 | Ryou et al. | |
| 2009/0257848 A1* | 10/2009 | Stroshein | E21B 19/14 414/22.65 |
| 2010/0149056 A1 | 6/2010 | Contant et al. | |
| 2010/0213942 A1 | 8/2010 | Lazarev et al. | |
| 2010/0243324 A1 | 9/2010 | Veeningen et al. | |
| 2011/0102186 A1 | 5/2011 | Buchkremer et al. | |
| 2011/0102188 A1 | 5/2011 | Mehta et al. | |
| 2012/0176138 A1 | 7/2012 | Prammer | |
| 2013/0106615 A1* | 5/2013 | Prammer | G01V 3/30 340/854.6 |
| 2013/0141102 A1 | 6/2013 | Donderici | |
| 2013/0249703 A1 | 9/2013 | Hawthorn et al. | |
| 2014/0231141 A1 | 8/2014 | Hay et al. | |
| 2014/0246237 A1 | 9/2014 | Prammer | |
| 2014/0338973 A1* | 11/2014 | Taylor | E21B 19/146 175/24 |

(56) References Cited

U.S. PATENT DOCUMENTS

2014/0367092 A1 12/2014 Roberson et al.
2015/0279170 A1* 10/2015 Gupta .................... G01V 1/22
340/6.1
2016/0340987 A1 11/2016 Prammer

FOREIGN PATENT DOCUMENTS

| WO | 2009143409 A2 | 11/2009 |
| WO | 2010078197 A1 | 7/2010 |
| WO | 2015048618 A1 | 4/2015 |

OTHER PUBLICATIONS

"DuPont Pyralux AP All-Polyimide Flexible Laminate," data sheet, Mar. 2001, DuPont Electronic Materials, Research Triangle Park, NC 27709-4425.
"High Performance Lithium Cell—Size 1/2 AAA P/N:4037 10-25-150," data sheet, Electrochem, Clarence, NY, Jan. 2006, 1 page.
"Recommended Practice for Drill Stem Design and Operating Limits—API Recommended Practice 7G," 16th Edition, Aug. 1998, American Petroleum Institute, API Publishing Services, Washington, DC., 30 pages.
"Recommended Practice for Drill Stern Design and Operating Limits—Addendum 1," Nov. 2003, American Petroleum Institute, API Publishing Services, Washington, DC., 30 pages.
"Specification for Rotary Drill Stem Elements—API Specification 7," 40th Edition, Nov. 2001, American Petroleum Institute, API Publishing Services, Washington, DC., 104 pages.
"TK-236," brochure, 2006, Tuboscope, Houston, TX 77051, 1 page.
"TK-34XT," brochure, 2006, Tuboscope, Houston, TX 77051, 2 pages.
American Petroleum Institute, "Specification for Rotary Drill Stem Elements—API Specification 7", 40th edition, Nov. 2001, API Publishing Services, Washington, DC, Fig. 16 and Table 16, pp. 24-25.
Archer, J.C., "Electric Logging Experiments Develop Attachments for Use on Rotary Rigs", The Oil Weekly, Jul. 15, 1935.
Arps, J.J. and Arps, J.L., "The Subsurface Telemetry Problem—A Practical Solution", Journal of Petroleum Technology, May 1964, pp. 487-493.
Bourgoyne, Jr. et al., "Applied Drilling Engineering", SPE Textbook Series, vol. 2, Society of Petroleum Engineers, Richardson, TX, 1991, Chapter 1: Rotary Drilling Process, 42 pages.

Denison, E.B., "High Data-Rate Drilling Telemetry System", Journal of Petroleum Technology, Feb. 1979, 31(2), 155-163.
Devereux, S., "Drilling Technology in Nontechnical Language", Penn Well Corp., Tulsa, OK, 1999, Chapter 5: Rig Selection and Rig Equipment, 22 pages.
Economides et al., "Petroleum Well Construction", Watters and Dunn-Norman, John Wiley & Sons, West Sussex, UK, 1998, Chapter 1: Introduction to Drilling and Well Completions, 28 pages.
European Search Report for Application No. 16797075.5-1002, dated Mar. 22, 2019, 14 pages.
Gjerstad, et al. "Automatic Prediction of Downhole Pressure Surges in Tripping Operations" IPTC 16974, International Petroleum Technology Conference held in Beijing, China Mar. 26-28, 2013, 15 pages.
Notification of Transmittal of the International Search Report and the Written Opinion of the International Searching Authority, or the Declaration; PCT/US2016/032652; dated Aug. 31, 2016; 12 pages.
Notification of Transmittal of the International Search Report and the Written Opinion of the International Searching Authority, or the Declaration; PCT/US2016/038029; dated Sep. 16, 2016; 8 pages.
Okubo, JP 2007208431 machine translation, Aug. 16, 2007, Copyright (C) 2007.
Patton, B.J. et al., "Development and Successful Testing of a ContinuousWave, Logging-While-Drilling Telemetry System," Journal of Petroleum Technology, Oct. 1977.
Pixton, D.S., "Very high-speed drill string communications network—Report# 41229R06", Novatek Engineering, Provo, UT, Mar. 2003, 10 pages.
Pixton, D.S., "Very high-speed drill string communications network—Report# 41229R14", Novatek Engineering, Provo, UT, Jun. 2005, 59 pages.
Pohlmann, Ken C., "Principles of Digital Audio," 6.sup.th Ed., McGraw-Hill, New York, 2011, Chapters 7 and 8, 123 pages.
Prammer et al., "Field Testing of an Advanced LWD Imaging Resistivity Tool", Society of Petrophysicists and Well-Log Analysts 48th Annual Loggings Symposium, Jun. 3-6, 2007, Austin, TX, 1-15.
Robinson, L.H., "Exxon completes wireline drilling data telemetry system", Oil & Gas Journal, Apr. 14, 1980, 137-149.
Seaton et al., "New MWD-Gamma system finds many field applications", Oil & Gas Journal, Feb. 21, 1983, 80-84.
Shokrollahi, A., "Raptor Codes", IEEE Transactions on Information Theory, Jun. 2006, 52(6), 2551-2567.

* cited by examiner

LOGGING-WHILE-TRIPPING SYSTEM AND METHODS

CROSS-REFERENCE TO RELATED APPLICATIONS

This application is a divisional of U.S. patent application Ser. No. 15/155,824 filed on May 16, 2016 which claims priority to U.S. Provisional Patent Application No. 62/163,697, filed May 19, 2015. The subject matter disclosed herein is also related to the subject matter disclosed by Prammer in U.S. Pat. Nos. 8,242,928, 8,704,677, 8,941,384, and 9,133,707, as well as in U.S. Patent Publication 2013/0106615 (the "Prammer system" or "Prammer systems"). The contents of these patents and patent applications are hereby incorporated by reference in their entireties.

TECHNICAL FIELD

The present invention relates to the field of data transmission systems, in particular to data transmission systems suitable for downhole use, such as on a drill string used in oil and gas exploration, or on completion strings, or on casing strings. The present invention is especially useful for obtaining downhole data or measurements while drilling as well as sending commands from the surface to downhole drilling equipment, downhole actuators or to other downhole instrumentation. In addition, the present invention is also useful for performing measurements and gathering data along a borehole while the borehole is being drilled.

BACKGROUND

The Prammer system allows communication between surface equipment and downhole equipment while the downhole equipment is deployed in a well. Specifically, a "surface interface sub" communicates along communication lines comprising cable segments, high-frequency signal couplers and repeaters, among others, with downhole equipment located either close to the drill bit or anywhere else along a drill string. The drill string is comprised of many pipe joints that are connected to each other via pin-and-box rotary connections. In an embodiment of the Prammer system, the box ends contain signal repeaters that compensate for the loss of signal amplitude along the cable segments spanning the pipe joints. Signals are communicated between pipe joints via electromagnetic resonance couplers that, being passive devices, also contribute to signal loss. The signal carrier frequency is typically located in the HF-to-UHF radiofrequency range.

The surface communication sub is typically located between a drive motor in a top-drive rig and the top of the drill string. Wired or wireless interfaces may provide connectivity between the surface communication sub and the communication systems within the rig. Typically, data gathered downhole may be telemetered to the surface within a few seconds and are also within a few seconds displayed to drilling and logging personnel.

A connectivity problem occurs during tripping operations. Drill pipe frequently needs to be pulled back out of the hole and broken down in "stands" of 1-3 pipe joints that are typically racked up within the derrick for further use. Such a need may arise when the drill bit is worn out and needs a replacement or when specialized equipment needs to be included in the drill string. During tripping, the drill string is no longer connected to the drive motor and to the surface communication sub. Instead, the top of the drill string, with the box end of the current topmost drill joint pointing up, is grabbed by specialized rig equipment known as the "elevator."

The elevator may be part of an entire "pipe handling system." During "trip out" the drill string is speedily hoisted up into the derrick. Then, the topmost stand is disconnected from the rest of the drill string and put aside ("racked up"). The reverse procedure, "trip in" takes racked-up stands one at a time, reconnects them to the drill string, and lowers them into the well. Since the well has already been drilled to a certain depth, there is no need to connect the drive motor and the surface communication sub is also not in use during that time. Both trip-in and trip-out need to proceed as fast as possible. Long drill strings may require many hours of tripping operations that are considered unproductive since the well is not progressing.

There is a need and a desire to monitor the well during tripping and to continue gathering real-time data during that period. A portion of the well is open-hole, i.e. not cased, and therefore fragile and susceptible to damage, collapse and/or unwanted fluid ingress and/or egress. The temperatures, pressures and hole dimensions, among other parameters, should be continuously monitored along the length of at least the open-hole section. Given such data in real time or close to real time, countermeasures such as, for example, adjustments of mud densities can be initiated. In another example, hole narrowing, which may be caused by swelling clay formations, can be effectively remediated by "reaming" the affected well section, i.e. by bringing it back to proper gauge, possibly followed by an increase in mud salinity to relieve the osmotic pressure on the formation.

Hole damage may even be brought on by the tripping operation itself. The rapid removal of drill pipe causes a sudden and temporary drop in borehole pressure and a fluid suction effect ("swabbing") develops that depends on the speed of drill pipe removal. Thus, a conflict exists between optimizing the tripping operation, i.e. minimizing the time required to remove the drill pipe, and the danger of damaging the borehole by sucking fluids and/or solids from the formation into the borehole. The maximum under pressure a formation can withstand without discharging fluids or solids into the borehole depends on the type and condition of the formation itself, and thus changes along the open-hole section of the well. It would be highly desirable to obtain at the surface a real-time reading of the actual borehole pressure close to the bit, thereby enabling the driller to optimize the tripping process, while safeguarding the integrity of the borehole and the surrounding formation.

Data gathering during tripping is called "logging while tripping" or "LWT." LWT is traditionally memory-based, i.e. data from underground sensors are recorded in downhole memory. That memory is accessed and read out once the memory device has reached the surface during trip-out. The time delay between data gathering and data readout reduces the usefulness and validity of the data. For example, in a well, already drilled to 20,000 ft., the bottom 2,000 ft. are open-hole and require monitoring. All relevant data could be gathered in, for example, one hour. The trip-out process, however, may take, for example, another 9 hours and the data are already 10 hours old when first processed and visualized. This may be much too late in a dynamically changing environment such as an open-hole section.

The drilling process typically "over balances" the rock formation, driving native fluids away from the well. Once a coat of drilling mud has solidified on the well walls, that coat allows the native fluids to return to their original equilibrium. Monitoring this process by what is called "time lapse logging" is another important application of LWT.

There is also a need for very sensitive measurements performed downhole. Traditionally, such measurements have been reserved for wireline operations (while stopped) that provide a much quieter downhole environment than logging-while-drilling (LWD) sensor platforms. Examples include high-precision acoustic measurements and high-precision NMR measurements. In the latter, measurements of proton relaxation times may extend to several seconds, in which the NMR sensor must remain in fixed position relative to the formation. The repetitive time periods occurring in tripping, when connections are made or broken and the drill string is held in place, can be ideal time slots for such sensitive measurements.

Another downhole communication system (the "Hall system") is described in U.S. Pat. No. 6,670,880 to Hall et al. Related to the Hall system, U.S. patent application Ser. Nos. 12/751,331 and 12/751,350, both by Veeningen et al., describe "communication interfaces" designed to provide LWT services on the Hall system. The interfaces are to be mounted on the elevator and would extend and retract carrying a Hall-style coupler. In their extended positions, the adapters would reach into the box of the topmost pipe joint such that an interface-mounted signal coupler makes physical contact with the box-mounted signal coupler. In the retracted position, the interface would get out of the way of pipe handling, allowing stands to be added or removed from the drill string.

The disadvantages of the Veeningen devices are obvious, considering that no standards exist for the design of elevators and pipe handling systems. For each rig design, the workings of the rig need to be carefully studied, following by the design and manufacturing of rig-design-specific interfaces. The interfaces are mechanically complicated and have to execute complex movements in the vicinity of fast-moving and highly automated machinery. The cables connecting the interfaces to the rig communication infrastructure are bothersome as they travel with the elevator up and down in the derrick and may get snagged and consequently ripped off.

A similar device, described by Zaleski et al. in U.S. patent application Ser. No. 13/758,406, operates stand-alone, i.e. without using the elevator as a mount. The use of the Zaleski device may be even more bothersome than the Veeningen device, as it directly interferes with the operation of the pipe handling system. At any time that the Zaleski device engages the drill string for purposes of communication, the operation of the pipe elevator must be halted. As such, the Zaleski device can be used only very sparingly and probably not at all with a highly or fully automated high-speed pipe handling system.

Therefore, a need exists for providing logging-while-tripping (LWT) services in a wired-pipe system without the need for physical access to any above-ground portion of the drill string for the purposes of retrieving data and/or to communicate with below-ground elements of the wired-pipe communication system. At the same time, the data should arrive at the surface in a timely fashion, i.e. within minutes instead of many hours as in memory-based LWT systems.

Segments of wired pipe may develop faults. These faults may be caused by the cables, by the couplers, and/or by the repeaters. It is highly desirable to detect such faults as early as possible. For example, a faulty segment, which could be a pipe joint or a stand, should not be tripped-in as it probably will render wired-pipe communication inoperable as long as the faulty segment is deployed underground. Reversely, during trip-out faulty segments should be detected as soon as they are on the rig floor, to be put aside and replaced with functioning segments.

Wired-pipe signal repeaters operate on power provided by internal batteries. It is highly desirable to detect repeaters with marginal battery charge that should not be tripped-in another time because the battery charge may not last for the entire duration of the next run. During trip-out, depleted or about-to-be-depleted repeaters should be detected as soon as they are on the rig floor, to be put aside and replaced with fresh repeaters.

Tripping operations are a highly automated and optimized work processes. It is often impossible to stop and/or to revert steps in the process. Such stopping and reversing, however, is needed in the aforementioned Hall wired pipe system in the case of communication connectivity failures in segments of the wired pipe. Although employing the Veeningen device during trip-in may detect that one or more faulty segments have been tripped-in, that information may already come too late for reversing the trip-in and replacing the faulty segment (s). Rather, trip-in typically continues and wired-pipe communication is not possible.

Testing wired-pipe segments runs into limitations on the rig floor. The pipe joints are typically assembled in stands that are racked up vertically, reaching heights of 90 feet or more. Conventional wired-pipe testing would call for sending test signals through pipe segments and measuring the attenuation of such signals. This method is more or less impossible, considering the limited access to the top end of the segment.

Therefore, a need exists to test wired-pipe segments, e.g. stands, on the rig floor, with access only to one end of each segment, before the segments are run into the hole and after segments have been pulled from the hole. Run-in could be a trip-in or a drill-forward operation. Pull-out could be a trip-out operation or may use the top-drive to rotate the drill string, in, for example, reaming operations.

SUMMARY

A downhole communication system and corresponding methods are provided that address the above-mentioned and other needs in the art by adapting a downhole communication system and associated methods to provide logging-while-tripping (LWT) data that are stored in a plurality of repeaters adapted to store segments of the logging-while-tripping data. The LWT data are transmitted to the repeaters during tripping and then read out of the repeaters at the surface. The repeaters are located in segments of wired drill pipe, where each segment may include one or more repeaters. The segments and repeaters are adapted to be tested at the surface for communication functionality while having access to only one end of the segments.

In an exemplary embodiment, a method and system for collecting logging-while-tripping data from a downhole communication system includes downhole communication equipment transmitting logging-while-tripping data, a plurality of repeaters each receiving and storing segments of the logging-while-tripping data, and one or more surface communication devices reading out the logging-while-tripping data from the repeaters at the surface. The segments and repeaters are read using a so-called "rack board" adapted to test segments of wired drill pipe, each segment having one or more repeaters. The rack board includes an array of communication couplers that are each adapted to exchange signals with a pin coupler of a wired pipe segment. In turn, each such communication coupler is connected with communication equipment adapted to process, transmit and display data stored in the one or more repeaters of the pipe segments during tripping. The communication equipment may verify functionality of communication circuitry of the pipe segment before run-in and/or after trip-out and/or download parameters stored in the one or more repeaters of the wired pipe segments. Such verification and parameter-download functionality may exist independently of the LWT functionality.

In another exemplary embodiment, a so-called "stand verifier" is provided that is adapted to test a wired pipe segment having one or more repeaters. The stand verifier includes a communication coupler adapted to exchange signals with a pin coupler of the pipe segment. In turn, the communication coupler is connected with communication equipment adapted to (1) verify functionality of communication circuitry of the pipe segment before run-in and/or after trip-out, and/or (2) download after trip-out logging-while-tripping data stored in the one or more repeaters of the pipe segment during tripping, and/or (3) download parameters stored in the one or more repeaters of the pipe segment. The functionalities (1)-(3) may exist independent of each other.

In yet another exemplary embodiment, a "fly-by stand verifier" is provided that communicates with a wired pipe segment having one or more repeaters, via radiofrequency signals over an air gap. The fly-by stand verifier may have one or more of the functionalities (1)-(3) of the ("sit-down") stand verifier described above.

In still another exemplary embodiment, a "box cap" is provided that communicates with a wired pipe segment having one or more repeaters from the box end of the pipe segment. The box cap may have one or more of the functionalities (1)-(3) of a stand verifier.

In another exemplary embodiment, a "box cap" and a "pin cap" are provided that communicate either separately or together with a wired pipe segment having one or more repeaters while the pipe segment is in horizontal position. The box cap, the pin cap, and the combination box cap/pin cap may have one or more of the functionalities (1)-(3) of the stand verifier.

These and other beneficial features of the invention will be apparent from the following detailed description of the exemplary embodiments of the invention.

DETAILED DESCRIPTION OF ILLUSTRATIVE EMBODIMENTS

A detailed description of illustrative embodiments of the present invention will now be described with reference to FIGS. 1-10. Although this description provides a detailed example of possible implementations of the present invention, it should be noted that these details are intended to be exemplary and in no way delimit the scope of the invention.

Figure 1:
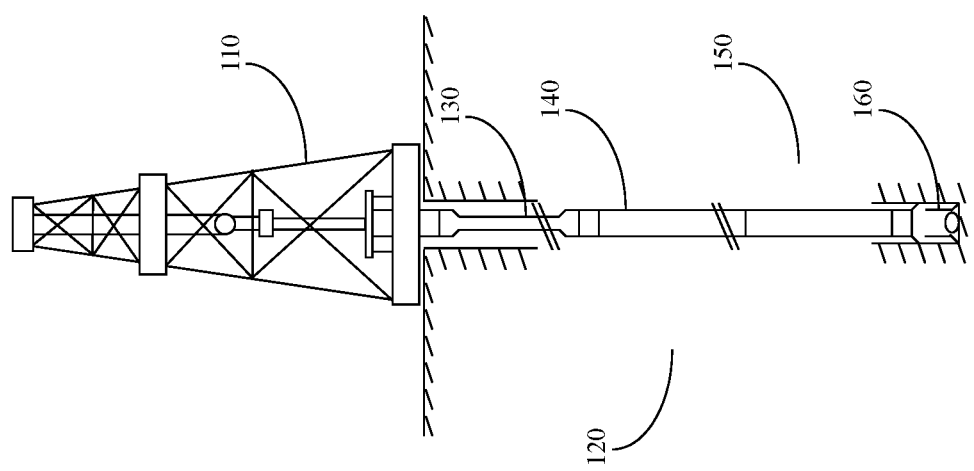
FIG. 1 is a schematic representation of a conventional drilling environment showing various drilling components.

A drilling operation suitable for implementing the present invention is shown in FIG. 1. The drill rig 110 drives a drill string 120, which is composed of a large number of interconnected sections 130, called pipe joints. The bottom of the drill string is composed of heavy pipe sections 140, called drill collars. In a typical drilling operation, the rig rotates the drill string and thus the bottom hole assembly (BHA) 150. The BHA 150 may contain various instrumentation packages, possibly a mud motor or a rotary-steerable tool, stabilizers, centralizers, drill collars and the drill bit 160. The drill string and all downhole components are hollow, allowing for drilling fluids to be pumped from the surface to the bit, with the drilling fluid returning to the surface in the outer annulus between the drill string and the formation for cleaning and re-circulation.

Figure 2:
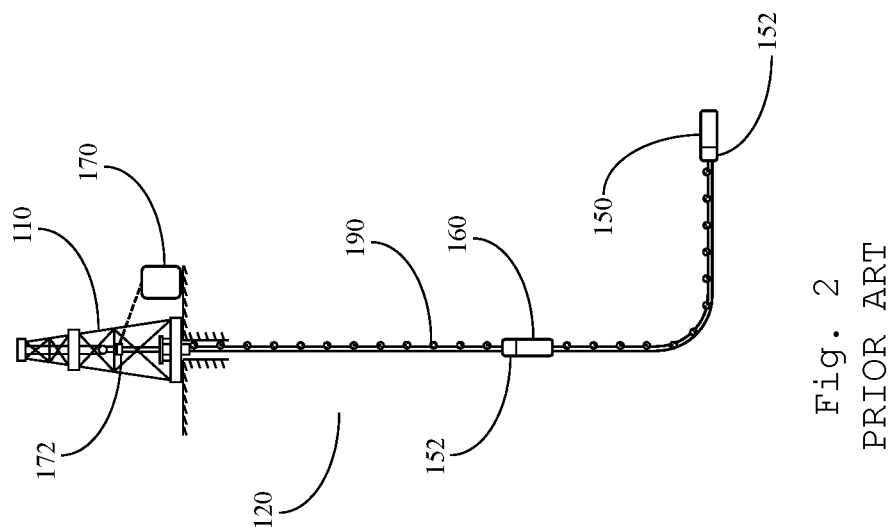
FIG. 2 is a schematic representation of a wired-pipe downhole communication system showing a plurality of signal repeaters.

The invention makes use of the fact that the Prammer system typically employs a large number of wired-pipe segments, together with a large number of signal repeaters. FIG. 2 illustrates the deployment of signal repeaters 190 within a wired-pipe drill string 120. The combination of wired pipe and repeaters forms a communication chain that connects the drill rig 110 with the BHA 150 and its instrumentation. Included in the BHA 150 is the downhole communication equipment (DCE) 152 that (a) interfaces with the rest of the BHA and (b) provides a communication bridge to the wired-pipe string. In addition, the drill string 120 may contain various sensor and/or actuator modules 160 that contain additional DCEs 152 and that are all accessible via communication along the wired-pipe/repeater string. At the surface, the string of repeaters is interfaced to the surface communication equipment (SCE) 170. The SCE 170 may comprise a surface interface sub (SIS) 172 that sits directly on top the wired-pipe string. The communication link between SCE 170 and SIS 172 may be wired by means of cabling or wireless by means of a radiofrequency link.

Figure 3:
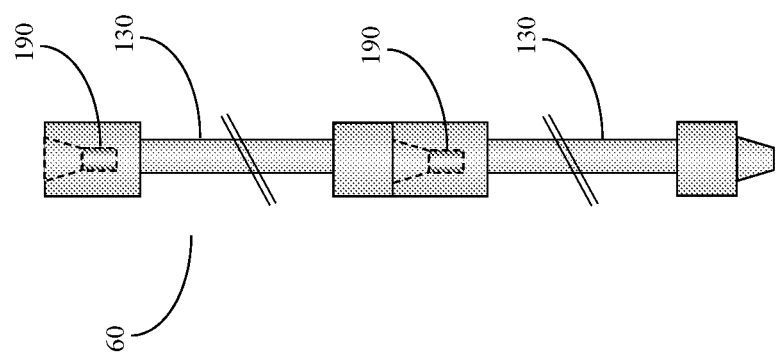
FIG. 3 is a schematic representation of a stand of joined drill pipe joints in half-transparent view showing internal components.

In a particular embodiment, the Prammer system may have one signal repeater 190 in the box of each pipe joint. As an example, in a 31,000-ft. long drill pipe, there may be 1,000 such signal repeaters 190 deployed. Given the fact that each repeater is equipped with a microprocessor unit (MPU) and associated memory, the sum of the distributed computing power and memory storage capacity is formidable. As illustrated in FIG. 3, a stand 60, comprising pipe joints 130, contains one or more signal repeaters 190. In the Prammer system, the box ends of pipe joints 130 are adapted to house one repeater per box.

During tripping it is necessary to have access to the top end of the drill string 120. That end is grabbed by specialized rig equipment ("elevator") and speedily hoisted up and down within the derrick. As a consequence, the SIS 172 must be disconnected from the drill string and cannot commence communication with any downhole equipment. Therefore, the surface communication equipment (SCE) 170 no longer has access to any downhole communication. The present invention makes available to the SCE an alternate communication path through a surface communication device (SCD) that circumvents the SIS 172.

In the present invention, logging-while-tripping (LWT) commences with the downhole communication equipment (DCE) 152 sensing the start of a trip-out sequence. The DCE 152, comprising one or more downhole modules, may be a downhole interface sub and/or any other module equipped to communicate data. Sensing may be based on a signal received from the surface equipment, or on the expiration of a timer, or on special conditions indicating trip-out, such as loss of communication with the SIS 172, indicating the drill string 120 has been disconnected from the SIS 172. The signal may also be derived from the power generated by the turbine-alternator combination, since the loss of this power indicates that drilling fluid circulation has stopped. In this situation, the downhole equipment switches to battery power. It is also possible to send coded signals downhole by repeatedly turning on and off the circulating pumps, creating recognizable patterns in the alternator-provided voltage.

In LWT mode, the downhole communication equipment 152 continuously receives sensor readings, time stamps the sensor data and transmits the data over the downhole communication network. Handshaking sequences with the surface communication equipment, as may be used in logging-while-drilling (LWD) mode, are not necessary.

The LWT data are specialized inasmuch as it is only necessary to transmit LWT-relevant sensor data. Furthermore, the data may be marked as LWT data, it may carry special LWT time stamps, and it may be formatted for processing by the repeaters. LWT data may be transmitted at a data rate different than LWD data to allow enough processing time for the repeaters 190. LWT and LWD data may differ in their respective modulation and encoding schemes. LWT and LWD data also may use different error detection and error correction methods.

Sensors included in LWT data for the purpose of monitoring borehole conditions may include: multi-axis caliper; annular borehole pressure; annular temperature; swabbing control/tripping optimization; among others. Such LWT data is typically more rapidly sampled than LWD data, due to the high upwards speed of the drill string 120 when lifted by the elevator. In order to achieve high spatial sampling density, the temporal sampling is preferably dense, for example, every 0.1 second, while the drill string 120 is in motion.

Sensors 160 included in LWT data due to their sensitivity to the drilling process may include: acoustic measurements, gravity measurements, any kind of deep-reading measurements and/or NMR measurements, among others. Such LWT data are typically sparsely sampled. In fact, one may want to make use of the intervals in tripping when the drill string 120 comes to a complete stop, providing an extraordinarily quiet and vibration-free environment for periods of time.

The repeaters 190 may be put into LWT mode by a specialized signal transmitted over the communication system or the repeaters 190 may sense LWT data from its special formatting, for example, by its unique header and/or frame structure. In LWT mode, the repeaters 190 copy the communication stream or portions thereof into their internal memory. A portion of the internal memory may be set aside to implement a circular buffer for holding LWT data. In a circular buffer, the newest data overwrites the oldest data, thereby always holding a copy of updated data in memory.

An LWT record, i.e. the collection of all sensor data taken at one time, may amount to, for example, 100-1,000 bits. Taken at a rate of 1 record per 0.1 seconds, a data stream of 1-10 kbps may result. The repeaters' LWT memory must be capable of buffering all data between consecutive pull-up actions of the elevator. The inventor has measured the cycle time of automated rigs to be about 1½ minutes, i.e. about every 1½ minutes a pipe stand 60 can be added (for trip-in) or can be removed (for trip-out) to the drill string 120. By taking 100 seconds as the required buffer time, one arrives at a required memory capacity of 10 kbps.times.100 sec=1 Mb LWT memory per repeater. This memory may be realized using a 1-Mbit (128 k.times.8) serial RAM chip per repeater, such as Microchip 23.times.1024.

The use of repeater LWT memory can be greatly optimized by realizing that the LWT data records are highly redundant every time the pipe stands still. Downhole equipment may sense such standstill by monitoring data from z-axis accelerometer(s) that show sudden and periodic acceleration and deceleration events during tripping. The downhole communication equipment 152 may schedule, e.g. switch between, borehole-monitoring and sensitive measurements, depending on the movement (or lack thereof) of the drill string 120. The downhole communication equipment 152 may compare sequential data records to detect redundancy, and/or may compress such data records and/or may transmit only non-redundant data records.

In an exemplary implementation, during trip-out, LWT data are broadcast to all repeaters 190 that store the identical data records in parallel in their respective memories. However, once a stand 60 reaches the surface and is disconnected from the drill string 120, the repeaters 190 contained in that stand 60 are cut off from further communication and retain a "frozen" image of the last data they have received. These data may span the last 100 seconds prior to disconnect. The disconnected stand 60 is typically transferred to a buffer area (the "vertical rack") within the derrick for the next trip-in operation.

As more and more stands 60 arrive at the surface, the individual repeaters 190 "freeze" their respective memories at different times. The individual "freeze frame" memory images, when arranged back-to-back after deleting overlapping data, may yield the LWT log over the entire trip-out interval, which may also be the entire well. Given, for example, 1,000 repeaters 190 arranged in stands of three pipe joints, there are 333 different log "freeze frames" of 100 seconds (the assumed tripping cycle time) each, or 33,300 seconds (over 9 hours) worth of LWT data. Typically, consecutive "freeze frames" would overlap, which is easy to detect and to correct based on the time stamps.

In operation, the LWT data are collected during the pull-out-of-hole (POOH) operation as a "listening only" operation (i.e., no "talking" to control the bottom hole assembly 150 from the surface) by one or more downhole communication modules that acquire and transmit LWT-relevant sensor data. In exemplary embodiments, repeaters 190 are adapted to hold the last few minutes of transmitted data in their logging memories. Thus, a pulled-out and disconnected stand 60 "freezes" a particular log data interval. Racked-up stands containing (probably overlapping) intervals thus span a portion of or the entire POOH operation. As an example, 322 ninety-three foot stands (30,000 feet total length) each holding 2 minutes' worth of data (8 kbps.times.120 seconds=1 Mb local memory per repeater) may account for about 10 hours of LWT data. Read-out of that data may start within minutes after the start of the POOH operation.

Figure 7:
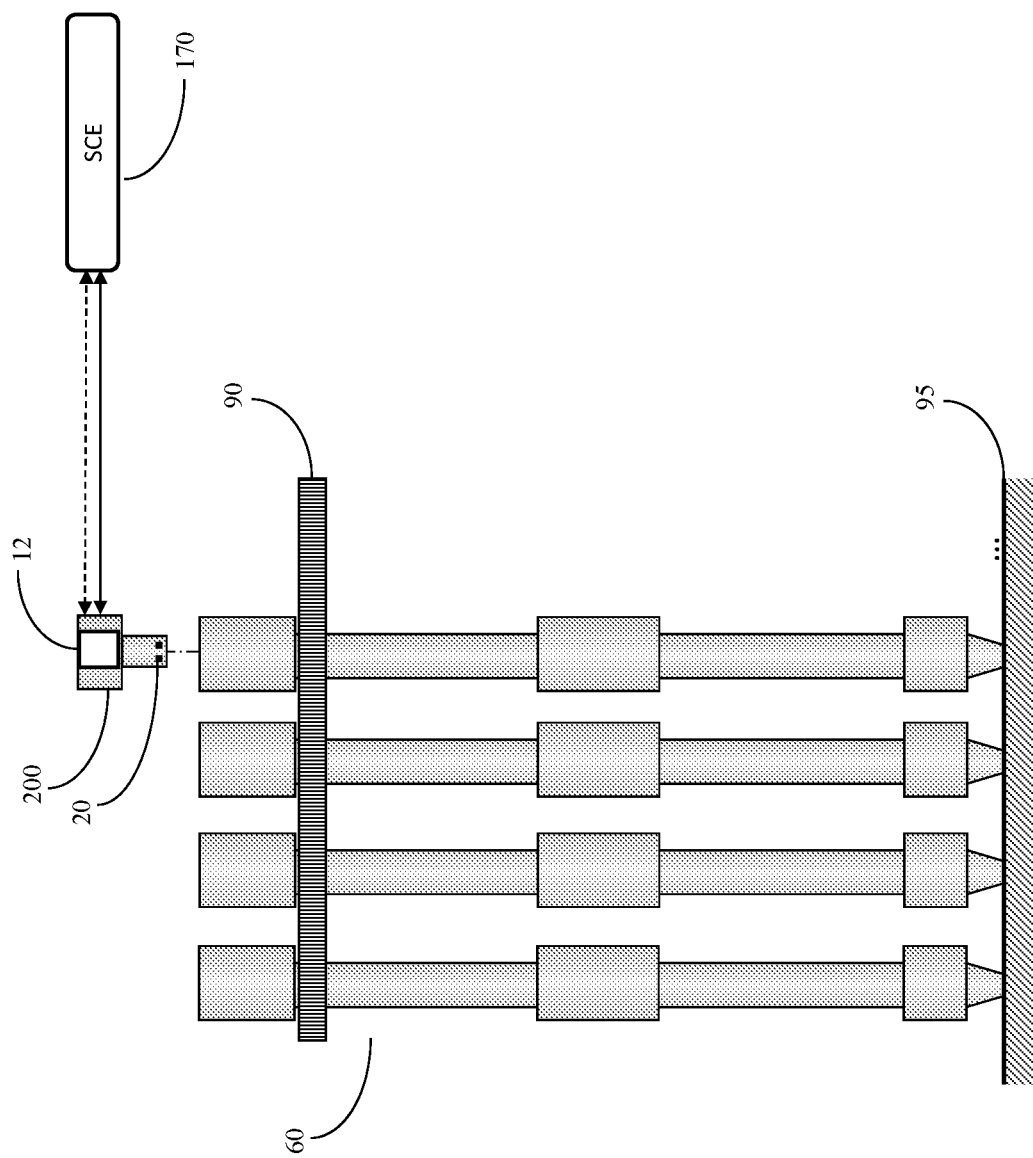
FIG. 7 illustrates a box cap prior to insertion into a vertically racked stand.

In simple drill rigs 110, the vertical rack area consists of not much more than a wooden-plank area under the "finger board" 90 (FIG. 4) high up in the derrick. The finger board 90 holds the stands 60 close to the box ends. The bottom pins simply stand on the wooden planks 95 (FIG. 7). This setup is unsatisfactory for a wired-pipe system. The exposed drill joint pins are likely to collect dirt that gets transferred to the rotary connection where it may interfere with connection make-up. Alternatively, the pins may stand on a soft, rubberized and clean surface for temporary protection, or protective pin caps/thread protectors are used.

In the context of the present invention, a surface communication device is introduced, called the "rack board" 10. The rack board 10 provides soft, rubberized surfaces for protected pin landing. It also provides for each pin a conical or semi-spherical rubberized pin guide 30 that positions each pin in exactly the right place, producing an exact array of racked pipe stands 60 and precisely seated pins.

Figure 4:
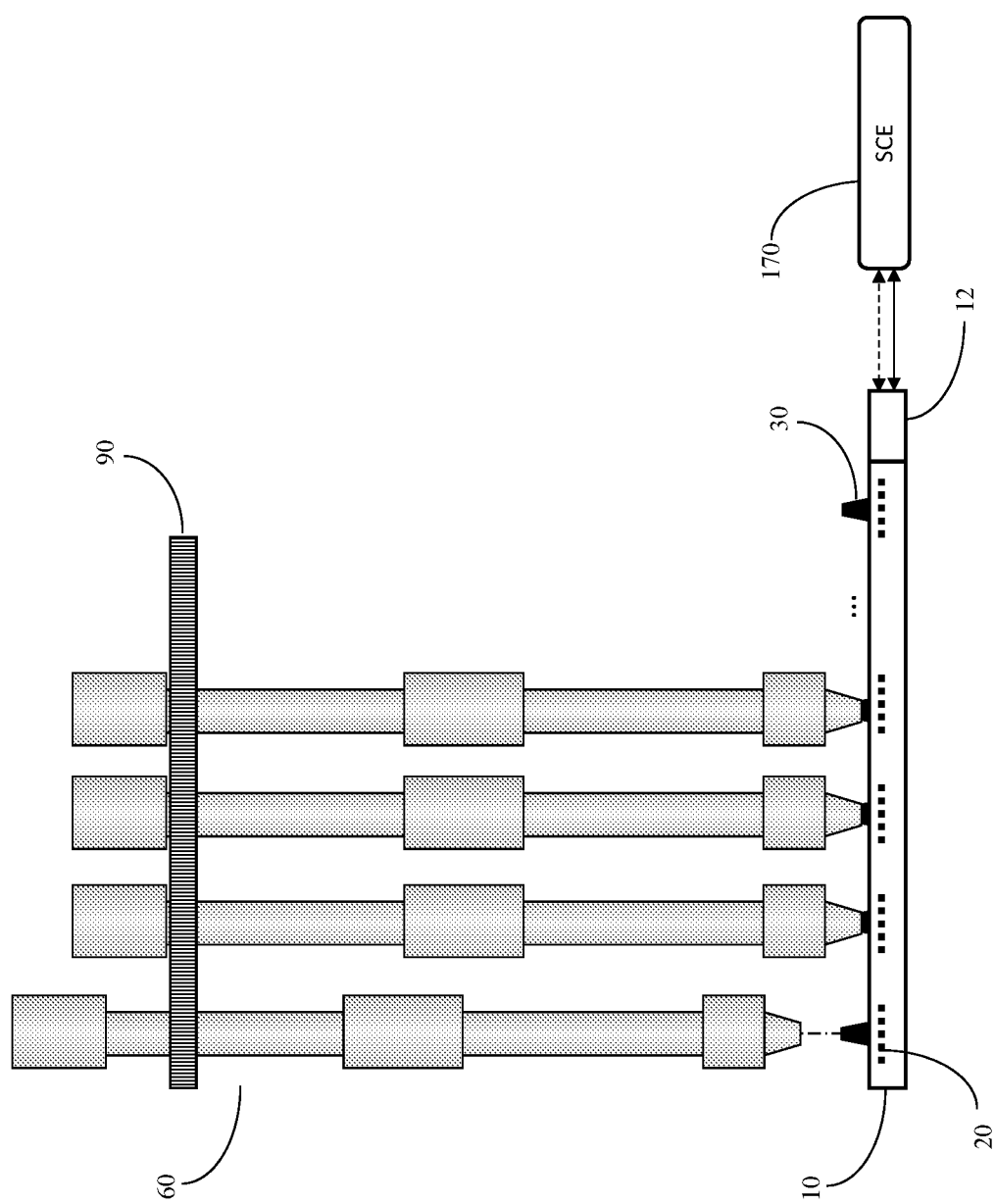
FIG. 4 illustrates an active rack board with several stands in place or being put in place.

FIG. 4 illustrates the side view of an "active rack board" 10 in accordance with the invention that may also provide for pipe and repeater verification before and after tripping. As illustrated, an active rack board 10 further provides an array of communication couplers 20, wherein a particular coupler 20 can exchange signals with a pin coupler seated immediately overhead. One such buried board-mounted coupler 20 is provided for each pin seating space. The couplers 20 are connected with communication equipment 12 that implements antenna-multiplexing hardware. Such multiplexing of antennas is commonplace in radiofrequency communication. The rack-board communication equipment 12 is typically in communication with the surface communication equipment (SCE) 170, which may be realized using conventional means for providing wired communication such as cabling (indicated by a solid double-arrow line in FIG. 4) or wireless communication such as a Wi-Fi, or other wireless data transmission modalities (indicated by a dashed double-arrow line in FIG. 4). Rubber or rubberized seating guides 30 are provided that fit the pin end of the lowest pipe joint. These seating guides 30 ensure that the pin couplers are precisely located above their corresponding couplers 20, while simultaneously protecting the exposed pin-end connection thread and signal coupler from damage.

The active rack board 10 may contain additional sensors, such as pressure or optical sensors indicating the presence or absence of a stand 60 at a specific pin seat, and/or visual indicators indicating various conditions for the pin seats, such as: vacant, occupied, tests passed, tests failed, access in progress, access completed, among others.

Figure 5:
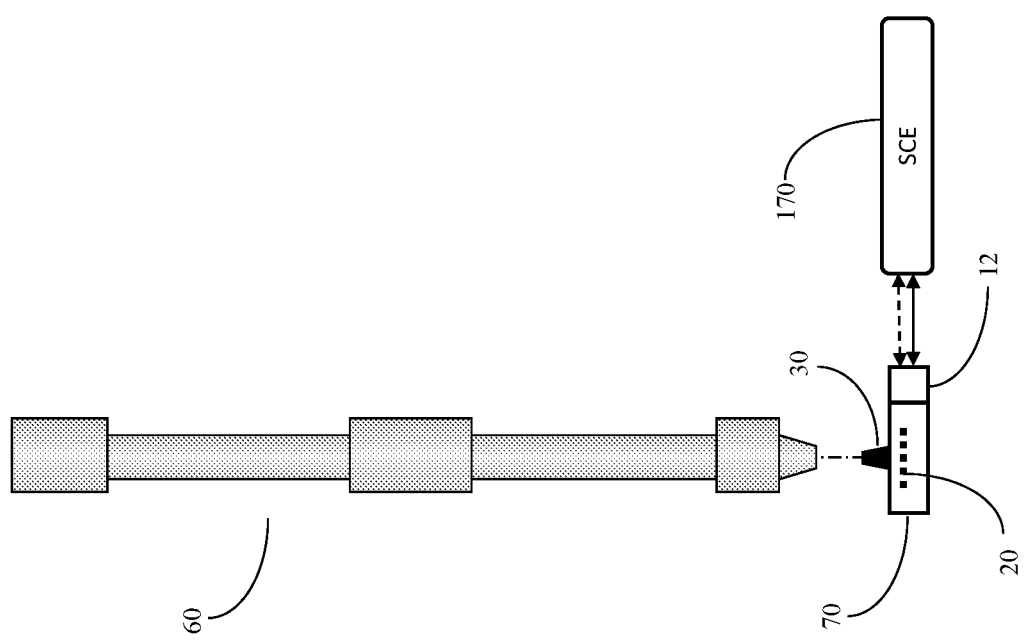
FIG. 5 illustrates a stand verifier that processes a single stand at a time.

The complete unit for a single stand 60, comprising the pin seating area, pin seating guide 30, buried coupler 20, signal connector(s), sensors and indicators, among others, shall be called a "tile" herein. The basic footprint of a tile may be a square or may be a regular octagon, the latter allowing for greater packing density for stands 60. Tiles may be assembled to active rack boards 10 of virtually any size. In the other extreme, even a single tile may be a self-contained, fully functional unit that processes a single stand 60 at a time as illustrated in FIG. 5. In this case, the surface communication device shall be called a "stand verifier" 70. The stand verifier 70 verifies stand functionality before run-in and after trip-out and downloads LWT data from repeater memories after trip-out (e.g., 2 minutes of log data with 50 times speed up takes 2.5 seconds). The stand verifier 70 and/or the active rack board 10 may also transmit pipe and repeater IDs, test results, and LWT data to the SCE 170 via communication equipment 12.

A tripped-out and disconnected pipe stand 60 is transferred to the rack area, and more specifically, landed pin-down on a vacant tile of the active rack board 10, with the top end slotted into a corresponding slot within the finger board 90. The communication equipment 12 within an active rack board 10 or a stand verifier 70 is adapted to communicate with all repeaters 190 in the stand 60 and to transfer collected data to the SCE 170. Upon sensing the addition of a stand 60, the active rack board/stand verifier 70 immediately attempts to communicate with all repeaters 190 within the added stand 60. If the communication equipment 12 of the active rack board/stand verifier 70 is programmed to expect three repeaters 190 per stand 60, which would be normal for full-height derricks and 31-ft. pipe joints, successful communication with all three repeaters 190 via the couplers 20 would be indicative that the communication system 12 (comprising couplers, wiring and possibly repeaters) within the stand 60 is operational. On the other hand, if only communication with fewer than the expected number of repeaters 190 is possible, the added stand 60 may be marked as unfit for another trip-in. The problem may be in the cabling, the couplers 20, or in the repeaters 190 themselves. As discussed, the communication equipment 12 may display such results on the active rack board/stand verifier itself.

The communication equipment 12 and/or the SCE 170 may assess the "health" of the cabling within the stand 60 by lowering the strength of its signal power. A repeater 190 may be factory-adjusted to a nominal, known receiver sensitivity, simplifying diagnostics. Given the type of the pipe joints, i.e. their nominal length, the nominal signal attenuation within a pipe joint is known. Nominal pipe joint lengths are, for example, 31 ft. and 45 ft. Therefore, it is known how much signal power is minimally required to reach, for example, the bottom, the middle, and the top repeater in a 3-joint stand. Higher power levels required than expected may be indicative of a "soft" problem, i.e. the pipe is still functional on a communication level, but may be on the verge of developing a problem in the cabling, in the repeaters and/or in the couplers 20. Such a compromised stand 60 should be excluded from the next run-in, since downhole conditions may magnify the problem.

Similarly, the rack board/stand verifier 70 communication equipment 12 may adjust its own receiver sensitivity and/or may include a received-signal measurement to measure the signals levels received from each repeater 190. Signal levels lower than expected based on the distance to the repeater 190 may indicate a low battery condition or a transmitter problem in that repeater 190. Again, such a compromised stand 60 may be flagged and may be excluded from the next run-in, since downhole conditions are likely to magnify the problem.

As discussed, the rack board communication equipment 12 can select with which wired-pipe drill string segment 60 to communicate by multiplexing between couplers 20. After that selection, it is in communication with all the repeaters 190 within a particular stand 60. If the rack board/stand verifier 70 communication equipment 12 already knows the repeater IDs, it may address the repeaters 190 individually by that repeater ID. Otherwise, it may first instruct the repeaters 190 to lower their signal sensitivities such that only communication with the bottom repeater 190 is possible. Conversely, the communication equipment 12 may lower its own signal power to the point where it is only in communication with the bottom repeater 190. Once the bottom repeater 190 has been accessed and has transmitted its ID, it can be addressed by ID and instructed to temporarily remove itself from communication. This allows the communication equipment 12 to address the second-lowest repeater 190 by increasing signal power or by instructing the remaining repeaters 190 to increase their sensitivities. This scheme continues until the IDs of all repeaters 190 within the stand 60 have been discovered and the repeaters 190 can be addressed individually by ID and at full signal power. Notwithstanding the particulars of the implementation, processes designed to find repeater IDs shall be called "repeater discovery."

In LWT mode, the rack board/stand verifier 70 communication equipment 12 may access and read out the LWT data stored in each repeater 190. The data are expected to be found redundantly in all repeaters 190 of the same stand 60. This allows the communication equipment 12 to detect and to possibly correct data errors by comparing repeater data and by possibly performing a majority-vote decision. Since read-out can be performed at high speed, it may take only a few seconds to access and retrieve the LWT data stored in a stand 60. The LWT data records are then transferred to the rig network for processing and data visualization.

Software may create the LWT log by collecting all "freeze frames" LWT data records harvested from the repeaters 190, deleting the overlap regions and stitching together the rest of the data to a continuous bottom-to-top log. Finally, the LWT data may be merged with time-to-depth information available in the surface system, converting the LWT log from time-based to depth-based for visualization.

Also discussed in the context of LWT, the active rack board 10 is equally useful as test and diagnostics equipment even if LWT is not desired. Between trip-out and the next trip-in, racked-up stands 60 can be continuously and/or periodically monitored for proper functionality.

Similarly, the stand verifier 70 is also useful outside the LWT application. Verifying the proper operation of each stand 60 after trip-out or before trip-in virtually eliminates the possibility of tripping in malfunctioning pipe joint/repeater combinations.

Figure 6:
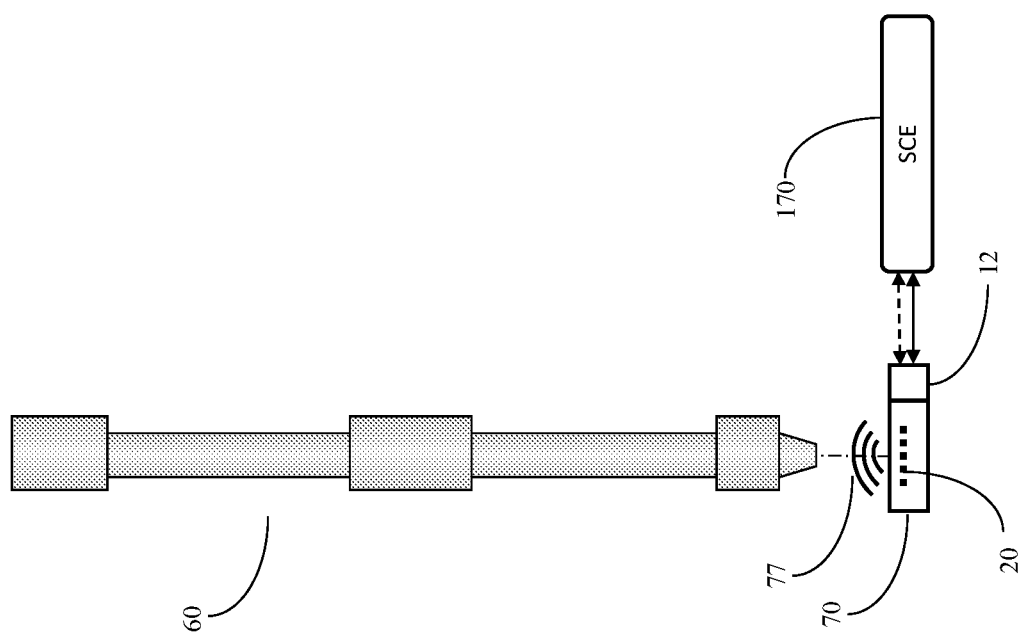
FIG. 6 illustrates a "fly-by" stand verifier that processes a single stand at a time.

In another implementation of the stand verifier 70, which is illustrated in FIG. 6, the built-in communication equipment 12 employs RF frontend amplifiers and/or power amplifiers to detect weak incoming signals and to boost outgoing signals. Thus, it becomes possible to bridge air distances 77 of a few inches using the RF signal. Such a "fly-by stand verifier" 70 does not need the stand 60 to be seated for data read-out and/or testing; instead, it suffices to simply bring a wired-pipe segment approximately in position over the stand verifier 70 with a few inches of air gap 77. Thus, testing may be performed on-the-fly and virtually transparent to normal rig operations as the segment is swung between the borehole and a conventional rack area.

In yet another embodiment of the present invention, and as illustrated in FIG. 7, data read-out and/or testing as described above, is/are accomplished using the box end of the drill joint stand 60. In this case, the surface communication device is a "box cap" 200 that is inserted into the topmost box of the wired-pipe segment 60. Access to the boxes of all stands 60 is provided by cat walks located along the finger board(s) 90. The stands may simply rest on ordinary planks 95. The box cap 200 is equipped with a coupler 20 and is able to communicate with the communication equipment 12 contained in the stand 60 from the top. The box cap 200 also comprises communication equipment 12 that communicates to an SCE 170 by wired or wireless means. It is not necessary that the stands 60 are racked vertically; they may also be placed horizontally.

Figure 8:
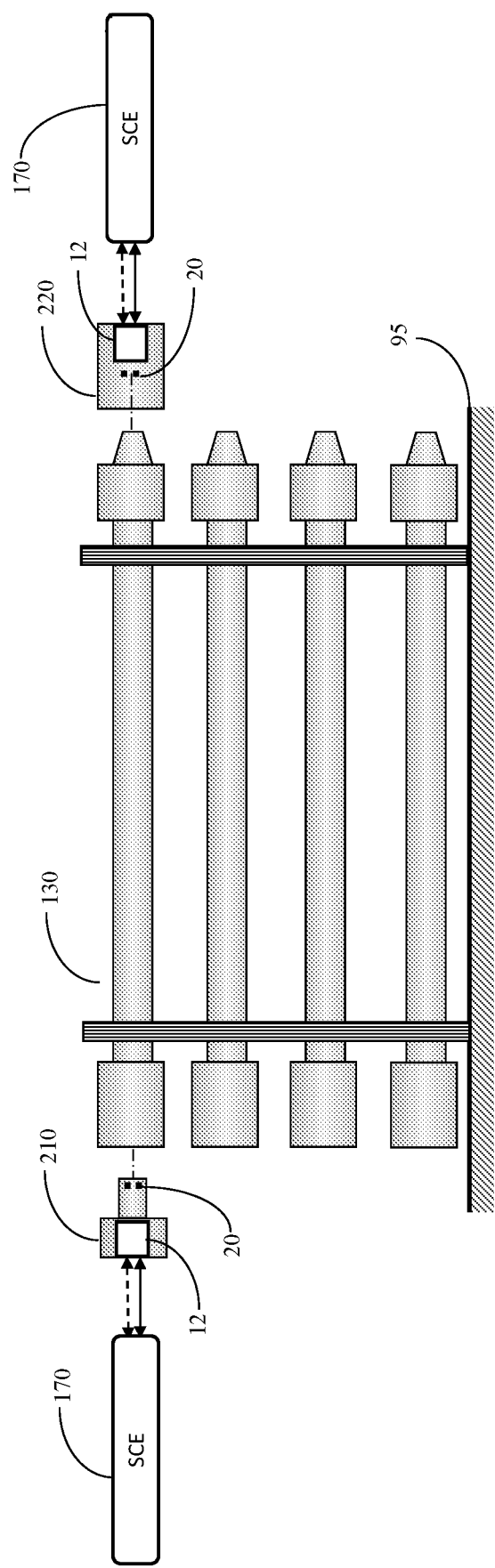
FIG. 8 illustrates a box cap and a pin cap, both prior to interfacing with a horizontally racked pipe joint.

As illustrated in FIG. 8, when stands 60 or pipe joints 130 are horizontally positioned, data read-out and/or testing as described above may be accomplished by access from either side, i.e. from the box side, from the pin side, or from both. A box cap 210 and/or a pin cap 220 are provided that interface mechanically and electrically with the respective ends of the wired-pipe segment. Using both box cap and pin cap has the additional advantage of being able to perform through-measurement tests that may or may not involve the repeaters 190 contained in the wired-pipe pipe joint 130.

Although the devices "rack board", "stand verifier", "fly-by stand verifier", "box cap" and "pin cap" have been described separately, they share many traits. Any device with similar functionality shall be referred to within the present application as "surface communication device" or "SCD". It should be understood that it is within the spirit and scope of the invention to substitute a different SCD for a specific SCD in the various descriptions of SCD functionality, contained either in preceding or in following paragraphs.

Figure 9:
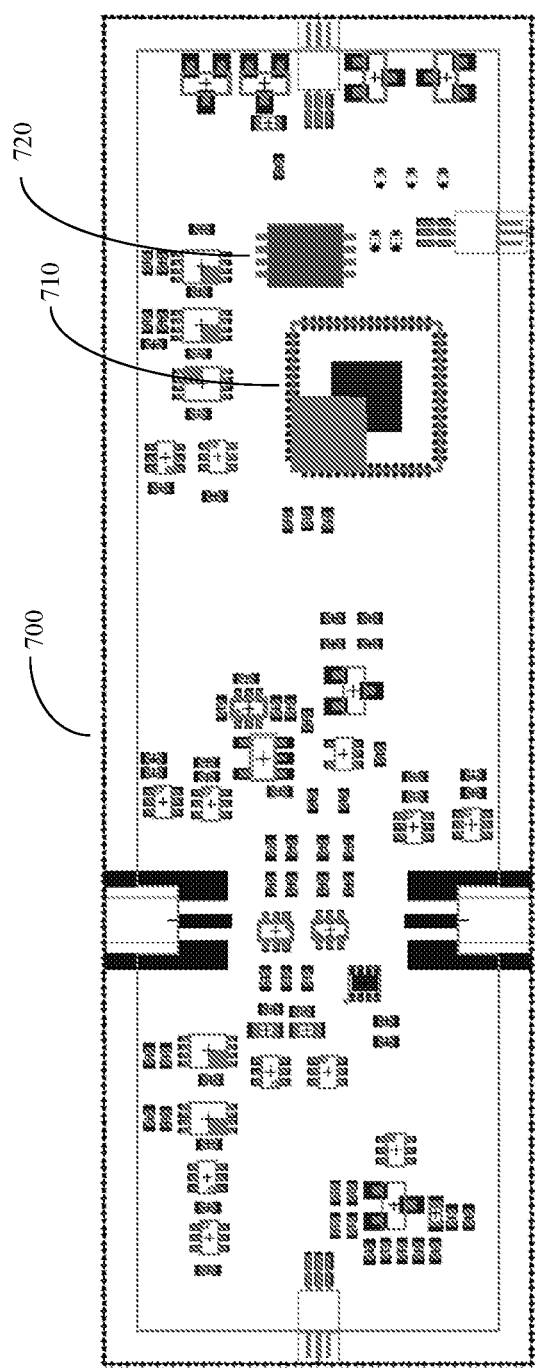
FIG. 9 illustrates a repeater electronics board.

A repeater electronics board suitable for the present invention is illustrated in FIG. 9. The electronics board 700 comprises analog and digital hardware components, including a microprocessor (MPU) chip 710 and a memory chip 720. In an alternate configuration, the memory may be internal to the MPU 710.

Figure 10:
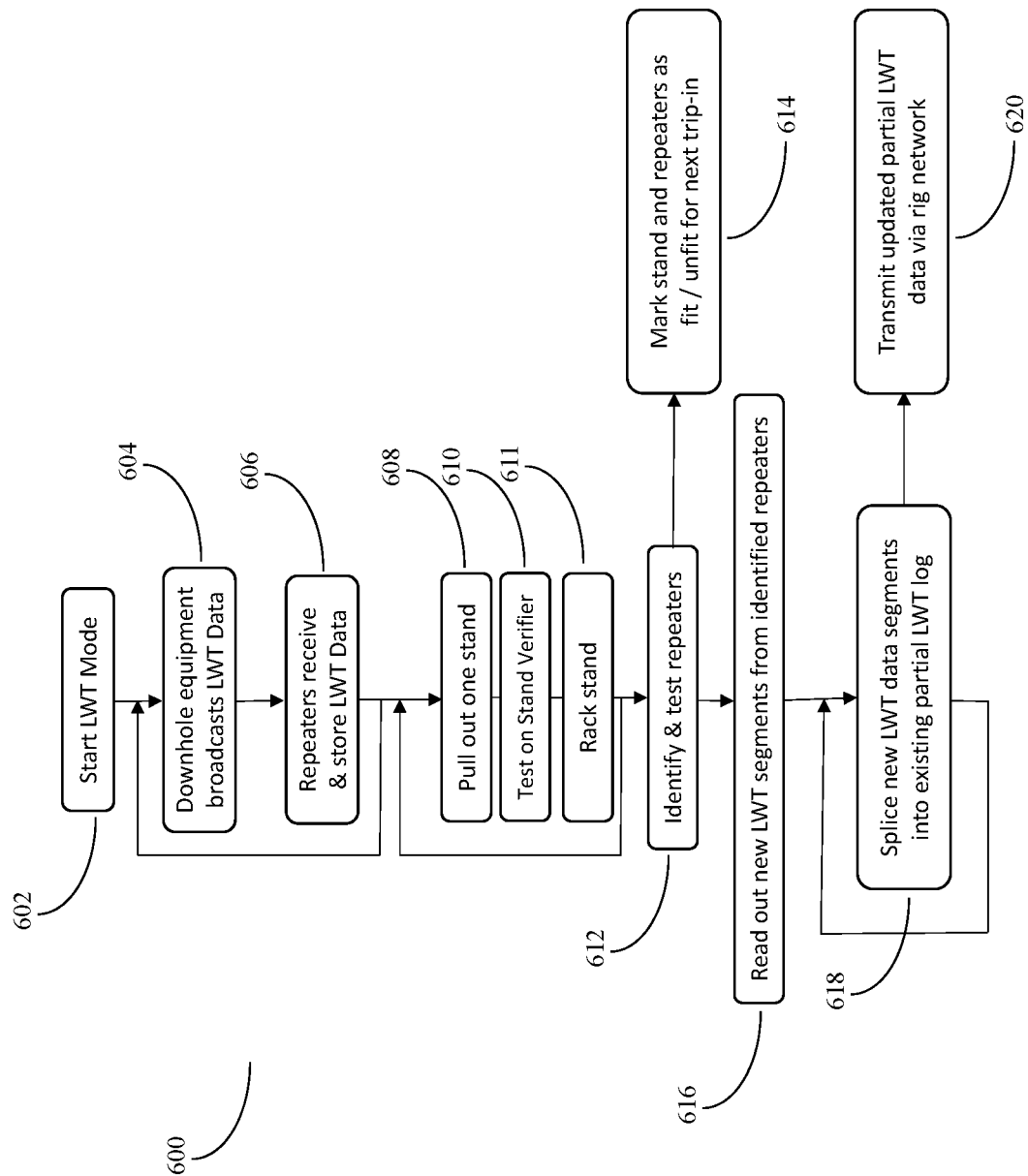
FIG. 10 illustrates the logging-while-tripping data flow in accordance with the invention.

The LWT control and data flow 600 is illustrated in FIG. 10. As discussed, there are various means to detect downhole the start of POOH ("pull out of hole"). That event may be used to put the communication system into LWT mode at 602. In LWT mode, downhole communication equipment does not expect to receive commands, data, acknowledgments, etc. from the surface. Rather, the downhole equipment continuously and/or periodically transmits LWT-relevant data at 604. As discussed earlier, the BHA, its sensors, and its communication equipment play a special role, since the tripping speed-related swabbing effect is most pronounced at the end of the drill string 120, making real-time borehole pressure monitoring particularly important.

In an alternate implementation of LWT, certain downhole communication equipment, such as the DCE 152 contained in the BHA 150, may assume the role of the (disconnected) SIS 172. Data are telemetered to that DCE 152 instead to the surface. The DCE 152 may contain sufficient memory to record a traditional memory-based LWT log. In addition, the repeaters 190 may "spy" on the communications and record in parallel segments of LWT data for real-time purposes as discussed earlier.

The LWT data may be sent to specific repeaters 190 (presumably to those close to the surface) or may simply be broadcast to all listening repeaters 190, which receive and store LWT data at 606. Since the LWT memory of a repeater 190 is typically too small to record LWT data over many hours, the oldest data are routinely overwritten by the newest data in a circular buffer in circular fashion. LWT mode is terminated either naturally when all downhole equipment has reached the surface, or after the expiration of a pre-set time interval or upon commands from the surface (in which case POOH may have been aborted).

Periodically, a stand 60 is pulled out and disconnected from the rest of the drill string 120 at 608. That stand 60 may be placed on a conventional ("sit-down") stand verifier 70 or over a "fly-by" stand verifier at 610 as discussed earlier, before being placed in a conventional rack area or on the active rack board (at 611). The active rack board, the stand verifier and/or any other SCD identifies the repeaters 190 in the newly-arrived stand at 612 and may determine the stand's fitness to be tripped in on the next run-in at 614. Next, the available LWT data segments may be retrieved from the accessible repeaters 190 at 616 and may be spliced together with earlier segments at 618, using the included time stamps. A partial LWT log may be generated that grows as more data segments arrive at the surface. The partial LWT logs may be made available for processing, visualization and archiving by transmission via the rig network at 620.

Those skilled in the art will appreciate various possible optimization strategies. For example, data gathering and transmission may be keyed off acceleration data, eliminating redundant data segments from time periods when the drill string 120 is stationary. Similarly, the use of delta-compression is beneficial and effective in reducing the size of LWT data segments, since consecutive data segments tend to be similar.

There is a time delay between the acquisition of LWT data downhole and its visualization. This time delay is mainly governed by the time is takes to disconnect the topmost stand 60 and to transfer that stand 60 to the active rack board (or stand verifier or any other SCD) 10. All other time delays (pull out pipe on the elevator, rack board detecting and accessing a new stand 60, rack board downloading LWT data, etc.) are small in comparison. The total latency time may be less than a few minutes, particularly in fully automated rigs. Thus, while the LWT data may not strictly be "real time," it is "quasi real time" in the sense that it is presented in timely fashion to make real-time decisions about the well and to initiate possible remediation of detected problems. In contrast, memory-based LWT incurs latencies of many hours, rendering on-the-spot decision making and remediation impossible.

The active rack board 10, the stand verifier 70 and/or any other SCD may read out other information from the repeaters 190. Such other information may contain the true length of each pipe joint 130. The true length of a pipe joint 130 may differ from its nominal length by up to a few feet, because (a) traditionally, this is not a well-controlled parameter and (b) reworking and re-cutting the threads requires cutting into the pin and box tool joints and thereby reducing overall pipe joint length. The true length of each pipe joint 130 can be easily determined by a shop or field measurement, for example, with a laser-based distance meter. The true length may be stored alongside the repeater ID, a pipe ID, among other parameters, in the repeater's memory. Read-out of such other information may or may not occur in the context of LWT.

By adding up the repeater-reported true lengths of the pipe joints 130, the surface communication equipment 170 can determine the true length of the wired-pipe segment 60 or 130, which in turn may be added to/subtracted from the current drill string length. Thus, an accurate, real-time reading of the actual drill string length is maintained at all times. Since the locations of measurement points along the drill string 120 are known and since all measurements are tagged with time stamps from the downhole clock synchronized to a surface clock, not only the times when measurements have been taken are known, but also the true distances of the measurements from the surface become known. This automatic, error-free time-to-depth correlation greatly simplifies the translation of LWD and LWT time-based logs into depth-based logs.

Logging-while-tripping is terminated by the downhole equipment switching out of LWT mode based on one or more events, such as the reception of a signal from the surface, or the expiration of a timer, or others. The downhole equipment may sense the presence of a surface communication interface, indicating the trip-out has ended. The end condition may also be sensed by the absence of the repetitive acceleration/deceleration spikes on the z-axis accelerometer data. The end condition may also be sensed by resumption of drilling fluid circulation, powering up the downhole turbine-alternator combination(s).

Upon trip-in, the drill rig 110 transfers pipe stands 60 from the rack area to the well head, to be connected to the drill string 120 and lowered by means of the elevator. Since the well is already drilled to a certain depth, performing the run-in to that depth is much faster with the elevator than with the top drive.

Whenever the pipe handler, which may be a robotic arm, grabs or is about to grab a wired-pipe segment 60 or 130 off the rack area, the active rack board 10 or any other SCD may signal whether or not that segment is fit for run-in. If indicated as "unfit", the pipe handler moves that segment to another rack area. Segments 60 or 130 in that "reject" area are excluded from further operations until they have been inspected. If, however, the active rack board 10 signals "fit," the pipe handler proceeds with mounting the selected segment on the drill string in progress. By following this procedure, no defective or compromised segments of the wired-pipe communication system are allowed to re-enter the well. The entire operation can be fully automated and streamlined for high-speed operation. Preferably, no human rig hands are present while the robotic operations are in progress. Instead, the progress of operations, including test results and running tallies of the various pipe categories, such as "fit", "unfit" or "unknown", are displayed in real-time, both on site and potentially off-site as well.

Some rigs may not be equipped to hold a full active rack board 10. These rigs may substitute the rack board 10 with another SCD, such as the "stand verifier" 70 shown in FIG. 5, the "fly-by stand verifier" shown in FIG. 6, or the "box cap" shown in FIG. 7, for an active rack board 10. Using these alternate SCDs may require intermediate steps during run-in and trip-out. "Run-in" may be a "trip-in" (using the elevator) or other operations (using the top drive). During run-in, a wired-pipe segment 60 or 130 may be transferred from the traditional, non-instrumented rack area to a "sit-down" or the "fly-by" stand verifier 70. The communication equipment 12 built into the stand verifier 70, independent of or together with the SCE 170, performs the communication and connectivity checks outlined above to classify the segment as "fit" or "unfit" for run-in. These checks are practically instantaneous compared to the pipe handling time. Depending on the signal from the stand verifier 70 and/or the SCE 170, the segment is either transferred to the drill string 120 or is put aside as described above.

When tripping out and collecting LWT data, a wired-pipe segment 60 or 130 that has arrived at the surface and has been disconnected from the drill string 120 is transferred to a stand verifier 70 ("sit-down" or "fly-by") or to any other SCD for downloading LWT data. Since the download proceeds at very high speed, it may take only seconds to retrieve all buffered LWT records. Since the stand verifier 70 also performs connectivity checks at the same time, a defective segment may be sorted out immediately. If that is not possible for logistical reasons, the compromised segment may be transferred back temporarily to the general holding area of the vertical rack, to be captured and removed before re-entry as described above.

The stand verifier 70, as a single-tile version of the active rack board 10, or any other SCD may perform all diagnostic functions described above in the context of the rack board 10. If, during run-in, a stand passes the tests, the true stand length may be computed from the repeater parameters, and the surface system (SCE) can be informed of the imminent increase in drill string length and the corresponding shift in sensor measurement points. The SCD may also augment the "hard", factory-programmed repeater IDs with "soft," temporary IDs that may be enumerations of repeaters 190, starting at the bottom of the drill string 120. Soft IDs simplify the addressing of deployed repeaters 190, since they can be simply called up in incrementing sequence.

The active rack board 10, the stand verifier 70 (either version) or any other SCD may also be of assistance to the pipe handling systems. Optimal use of the pipe inventory calls for equalized wear and tear on all pipe joints 130 and rotary connections. By keeping track of the pipe IDs read out from the repeaters 190, the systems may tally underground service hours on a joint-by-joint basis. To first order, pipe wear is proportional to usage hours and the rack board 10 may direct the pipe handling system to optimally rotate pipe joints as the drilling process progresses. It may be also advantageous to mix up pipe joints 130 making up stands 60 in order to expose all rotary connections equally to a similar number of make-break cycles. The rack board 10, any other SCD and/or the SCE 170 may also employ algorithms designed to expose pipe joints 130 and their repeaters 190 to similar temperature profiles. It is advantageous to rotate the pipe joint 130 through the hottest sections of the well to achieve equalized wear on, for example, the repeater's batteries.

The active rack board 10, the stand verifier 70, any other SCD and/or the SCE 170 may also take into account diagnostic information read out from the repeaters 190. Such diagnostic information may contain usage information, such as a tally of all bits or pulses transmitted, battery voltage and voltage history, battery temperature and history, whether the battery is depleted or almost depleted, among others. From these data, algorithms may identify repeaters 190 suffering from excessive battery depletion, may it be from overuse or operation at high temperatures over extended times. Stands 60 with such functional, but slightly compromised repeaters 190 may be automatically scheduled for "lighter duty" in the shallower sections of the well, exposing them only to lower temperatures. Managing temperature exposures this way can help to avoid unintended stress to particular units of the system, which may cause premature failure.

It should be understood that this invention is not limited to the particular embodiments disclosed, but it is intended to cover modifications within the spirit and scope of the present invention as defined by the appended claims. For example, intelligence (processing power) in addition to memory elements could be distributed amongst the repeaters to provide distributed processing power in addition to a distributed gigabyte memory over a drill string. All such aspects of the invention are intended to be covered by the appended claims.

What is claimed is:

1. A downhole communication repeater adapted for use in an associated wired drill pipe segment of a wired pipe drill string that extends from a surface to a bottom hole assembly, said bottom hole assembly comprising downhole communication equipment, and said surface having surface communication equipment located thereon,
wherein said surface communication equipment and said downhole communication equipment are not in communication with each other for a duration of a tripping operation;
said repeater comprising memory and adapted:
to store segments of logging-while-tripping data generated by said downhole communication equipment in said memory while said repeater is deployed along the wired pipe drill string in a well during said tripping operation; and
to re-transmit the segments of said logging-while-tripping data to the surface communication equipment while said repeater and said associated wired drill pipe segment are stored in a rack board during said tripping operation,
wherein the rack board adapted to house a plurality of seating guides, and
a seating guide of the plurality of said seating guides is adapted to ensure that a pin coupler of the wired drill pipe segment is located above a communication coupler.

2. The repeater of claim 1, wherein said memory is periodically overwritten to store a new segment of said logging-while-tripping data.

3. The repeater of claim 1, wherein said repeater is responsive to radiofrequency signals.

4. The repeater of claim 1, wherein said repeater is adapted to be housed in a rotary connection of a wired drill pipe.

5. The repeater of claim 1, further comprising a microprocessor that is responsive to dedicated logging-while-tripping commands from said surface communication equipment and from said downhole communication equipment.

6. A surface communication device adapted to communicate with a repeater adapted to store logging-while-tripping data received from downhole communication equipment and located in an associated wired drill pipe segment that is part of a wired pipe drill string, wherein the downhole communication equipment is not in communication with a surface communication equipment during tripping operation, said surface communication device comprising:
a structure that holds the associated wired drill pipe segment;
at least one communication coupler adapted to exchange signals with a pin coupler or a box coupler of the associated wired drill pipe segment carrying the repeater while said wired drill pipe segment is positioned proximal of the at least one communication coupler,
said at least one communication coupler reading the logging-while-tripping data during the tripping operation from said repeater of said associated wired drill pipe segment via said pin coupler or said box coupler while said repeater and said associated wired drill pipe segment are stored in the structure and have been removed from the wired pipe drill string;
a seating guide of a plurality of seating guides is adapted to ensure that the pin coupler of the wired drill pipe segment is located above the at least one communication coupler,
wherein the structure is a rack board adapted to house the plurality of said seating guides.

7. The surface communication device of claim 6, further comprising said repeater for providing wired or wireless communications with the surface communication equipment.

8. The surface communication device of claim 6, wherein said at least one communication coupler communicates with a said pin coupler of said associated wired drill pipe segment using radiofrequency signals.

9. The surface communication device of claim 6, further comprising a communication equipment that communicates with said at least one communication coupler and is programmed to test functionality of the repeater.

10. The surface communication device of claim 6, further comprising a communication equipment that is programmed to indicate functionality of the repeater.

11. The surface communication device of claim 10, wherein said communication equipment provides an indication that the repeater has a depleted or nearly depleted battery.

12. The surface communication device of claim 6, further comprising a pressure and/or optical sensor that indicates a presence or an absence of the wired drill pipe segment in a pin seat of said seating guide.

13. The surface communication device of claim 6, further comprising a visual indicator indicating various conditions while said repeater is cut off from downhole communications.

\* \* \* \* \*